United States Patent [19]

Yen et al.

[11] Patent Number: 5,490,035
[45] Date of Patent: Feb. 6, 1996

[54] CYANORESIN, CYANORESIN/CELLULOSE TRIACETATE BLENDS FOR THIN FILM, DIELECTRIC CAPACITORS

[75] Inventors: Shiao-Ping S. Yen, Altadena; Carol R. Lewis, La Canada, both of Calif.; Peter J. Cygan, Eatontown; T. Richard Jow, Chatham Township, both of N.J.

[73] Assignee: The United States of America as represented by the Administrator of the National Aeronautics and Space Administration, Washington, D.C.

[21] Appl. No.: 73,015

[22] Filed: May 28, 1993

[51] Int. Cl.$^6$ ................................ H01G 4/06; H01G 4/08
[52] U.S. Cl. ................................................ 361/311; 361/323
[58] Field of Search ........................... 361/311, 323, 361/273; 29/25.42; 524/733; 106/163.1, 168, 169; 536/30, 31

[56] References Cited

U.S. PATENT DOCUMENTS

| | | | |
|---|---|---|---|
| 3,277,032 | 10/1966 | Caldwell | 524/733 |
| 3,582,728 | 6/1971 | Thoma | 361/286 |
| 4,026,718 | 5/1977 | Cornille et al. | 106/168 |
| 4,323,948 | 4/1982 | Mercier et al. | 361/315 |
| 4,438,262 | 3/1984 | Murase et al. | 536/43 |
| 4,843,517 | 6/1989 | Maruyama et al. | 361/323 |
| 5,055,360 | 10/1991 | Ogura et al. | 428/473.5 |

FOREIGN PATENT DOCUMENTS

| | | |
|---|---|---|
| 58-097822 | 6/1983 | Japan . |
| 61-130346 | 6/1986 | Japan . |
| 654642 | 4/1979 | U.S.S.R. . |

OTHER PUBLICATIONS

Smirnova, G. N. CA78(12):73822q.

Primary Examiner—Bot L. Ledynh
Attorney, Agent, or Firm—Thomas H. Jones

[57] ABSTRACT

Non brittle dielectric films are formed by blending a cyanoresin such as cyanoethyl, hydroxyethyl cellulose (CRE) with a compatible, more crystalline resin such as cellulose triacetate. The electrical breakdown strength of the blend is increased by orienting the films by uniaxial or biaxial stretching. Blends of high molecular weight CRE with high molecular weight cyanoethyl cellulose (CRC) provide films with high dielectric constants.

8 Claims, 2 Drawing Sheets

CYANORESIN, CYANORESIN/CELLULOSE TRIACETATE BLENDS FOR THIN FILM, DIELECTRIC CAPACITORS

ORIGIN OF THE INVENTION

The invention described herein was made in the performance of work under a NASA contract, and is subject to the provisions of Public Law 96-517 (35 USC 202) in which the Contractor has elected not to retain title.

TECHNICAL FIELD

This invention relates to advanced high energy density capacitors and, more particularly, this invention relates to such capacitors incorporating a thin film of cyanoresin or cyanoresin/cellulose triacetate blend having both a high dielectric constant and a high breakdown strength.

BACKGROUND OF THE INVENTION

Pulsed power capacitors are being developed as land based and space based weapons. There is an urgent need for a high energy density pulsed power capacitor with an energy density greater than 10 KJ/Kg and the ability to deliver energy in the milliseconds range for electro-magnetic gun applications. The highest energy density of current commercially available capacitors is 1.5 KJ/Kg.

The electrostatic energy which can be stored in any dielectric device is directly proportional to: (1) the effective capacitance of the device, and (2) the square of applied voltage. (1) is controlled by the effective dielectric constant and (2) is limited by the breakdown voltage of the dielectric material used in the device.

Polyvinylidene fluoride (PVDF) has the highest dielectric constant of any commercially available capacitor dielectric. A film of PVDF has a dielectric constant of 11 and a small area breakdown strength of 19 KV/mil. Experimental capacitors with energy densities of 2.5 KJ/Kg have been reported but are not yet commercially available.

In the last 10 years there has been a significant effort to develop new polymer films with higher dielectric constants and higher breakdown strengths than PVDF films.

Cyanoresins have high dielectric constants ($\epsilon$>15) and are commercially available as film forming resins. Commercial-grade, high dielectric constant cyanoresins have been available since the late 1960's and have been widely used as a coating material for electroluminescent lamps. However, cyanoresin film has not been produced as a capacitor dielectric due to low electrical breakdown strength ~2 KV/mil and brittle nature of the material.

LIST OF REFERENCES

| | |
|---|---|
| Caldwell | 3,277,032 |
| Thoma | 3,582,728 |
| Cornille, et al. | 4,026,718 |
| Mercier, et al. | 4,323,948 |
| Ogura, et al. | 5,055,360 |
| Matsushita | JP 58097822 |
| Kuroda, et al. | JP 61130346 |
| Otkrytiya, et al. | SU 654,642 |

STATEMENT OF THE PRIOR ART

Caldwell discloses blends of cellulose triacetate (CTA) with a methylacrylate polymer.

Thomas discloses a humidity sensor based on changes in capacitance. The electrode layers can be composed of CTA or other cellulose esters or ether.

Cornille, et al. discloses modifying regenerated cellulose. In Example 2 cyanoethyl starch is added to a viscose containing cellulose to form a regenerated film containing 18% cyanoethyl starch based on the total of cellulose and cyanoethyl starch.

The capacitor disclosed by Mercier, et al. utilizes cyanoethyl cellulose as an electrode film in a composite dielectric. There are 2 discrete layers—one layer having a higher dielectric constant and/or lower resistivity than the other.

Ogura, et al.'s electro-luminescent device includes a composite insulating layer of an inorganic film and an organic film which can be cyano-lower-alkylated cellulose having a dielectric constant of 15 to 25.

Japanese patent to Daicel Chemical Industries teaches a thin film (0.5 to 10 µm) of cyanoethyl cellulose to protect to printing equipment for integrated circuits.

The Japanese patent to Matsushita Electric teaches aluminized cyanoethyl cellulose as a capacitor.

The Russian patent teaches a dielectric film formed of equal amounts of cellulose acetate butyrate and cyanoethyl cellulose.

The Chemical Abstracts publication discloses forming films from a mixture of cellulose acetate, cellulose propionate and cyanoethyl cellulose having a dielectric constant of 5–6.

STATEMENT OF THE INVENTION

The mechanical properties of cyanoresins as thin films for capacitors are improved by blending various cyanoresins, particularly high molecular weight cyanoethylated hydroxyethyl cellulose (CRE) with cyanoethyl cellulose (CRC). The electrical breakdown strength of the cyanoresin films is improved by blending the cyanoresin with a resin having a higher crystallinity such as cellulose triacetate.

The invention also relates to new methods for casting and fabricating thin films of the blended resins. The blended resins are dissolved in a common solvent. The common solvent systems contains a low vapor pressure, high boiling temperature, non-solvent. The non-solvent is the last to evaporate and helps to lift the very thin film from the casting drum surface. Uniaxial and biaxial orientation of the film increases crystallinity of the crystallized resin and thus further improves the electrical breakdown properties of the film.

Cellulose triacetate and the cyanoresins have a high oxygen-to-carbon ratio. Resins of this nature have self-healing characteristics. Self-healing is a local phenomenon during which a short circuit in a plate capacitor causes arcing and decomposition of the dielectric film in the path of the arc. Rather than permitting the decomposition to propagate, the hydrogen, carbon dioxide and water decomposition products locally passivate the adjacent metal film by vaporization or oxidation of the metal. The device is passivated before any significant current can flow into the fault side of the device. The capacitor returns to its operative mode almost instantly. Furthermore, the self-healing characteristic of the cyanoresin films are substantially improved by blends with improved mechanical properties. The higher Tg films provide better attachment to the metal localizing the decomposition fault action. Also the cellulose triacetate increases the oxygen to carbon ration of the blends. Higher reliability is provided by self-healing of the dielectric film.

These and many other features and attendant advantages of the invention will become apparent as the invention becomes better understood by reference to the following detailed description when considered in conjunction with the accompanying drawings.

DETAILED DESCRIPTION OF THE INVENTION

Figure 1:
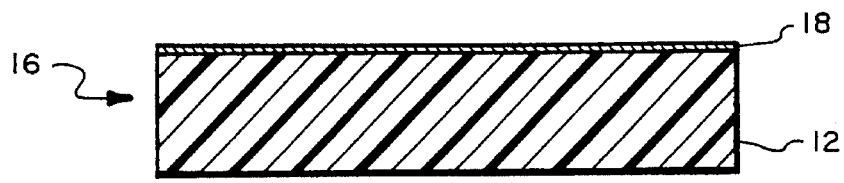
FIG. 1 is a cross-sectional view of a dielectric film of a cyanoresin having a metallized surface according to the invention.

The cyanoresins utilized in the invention can have an aliphatic, aromatic or aryloxy backbone. The resins have a nitrogen content based on CN groups of about 7 to 15% by weight, preferably from about 9–13% by wight and a viscosity (20% DMF solution at 20° C.) typically from about 300 to 60,000 cp. The structure of the repeating unit of 4 commercial cyanoresins are provided below.

TABLE 1

| Sample | $\epsilon$ | tan$\delta$ | Volume Resistance (Ω – cm) | Breakdown Voltage V/ml |
|---|---|---|---|---|
| 120 Hz | | | | |
| CR-S | 19.0 | 0.0015 | $4 \times 10^{12}$ | 2,100 |
| CR-C | 16.5 | 0.022 | $4 \times 10^{11}$ | 2,000 |
| CR-V | 19.7 | 0.064 | $1 \times 10^{12}$ | 1,800 |
| CR-E | 18.8 | 0.041 | | |
| 1 KHz | | | | |
| CR-S | 16.6 | 0.0013 | $4 \times 10^{12}$ | 2,100 |
| CR-C | 16.3 | 0.015 | $4 \times 10^{11}$ | 2,000 |
| CR-V | 19.2 | 0.040 | $1 \times 10^{12}$ | 1,800 |
| CR-E | 17.9 | 0.053 | | |
| 10 KHz | | | | |
| CR-S | 18.0 | 0.0027 | $4 \times 10^{12}$ | 2,100 |
| CR-C | 15.9 | 0.023 | $4 \times 10^{11}$ | 2,000 |
| CR-V | 18.6 | 0.042 | $1 \times 10^{12}$ | 1,800 |
| CR-E | 16.7 | 0.072 | | |

Dielectric Constant ($\epsilon$) Dissipation Factor (tan$\delta$), Resistivity ($\rho$) and Breakdown Strength ($E_b$) of Cyanoresins at 25° C.

Cyanoresins are generally soluble in acetone, acetonitrile, furfuryl alcohol, tetrahydrofurfuryl alcohol, nitromethrane, N,N-dimethylforamide, N-methyl-2-pyrolidone, $\gamma$-butyrolatone and propylene carbonate. Some of the resins are soluble

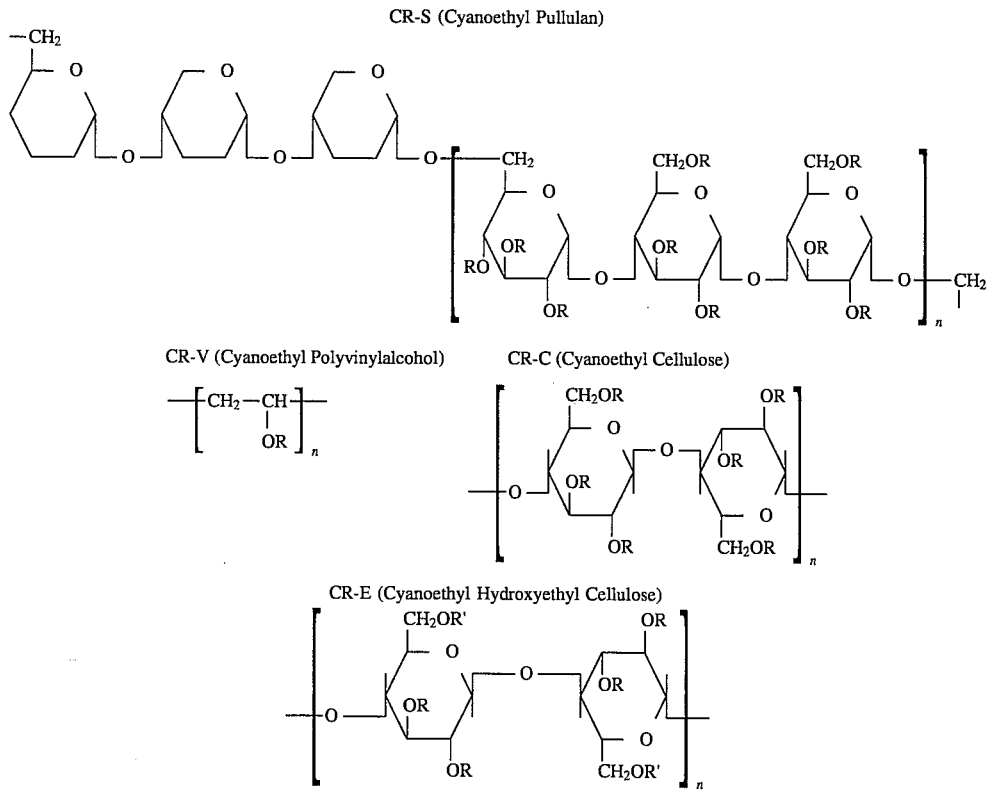

Where R is —$CH_2$—$CH_2$—CN or H, a sufficient amount of the cyano group being present to provide the desired nitrogen content and R' is —$CH_2$—$CH_2$—OH or H.

Physical, thermal and mechanical properties are presented in Table 1.

in halogenated solvents such as methylene chloride or chloroform.

Commercial cyanoresins are mainly used to coat the surface of electroluminescent layers of a lamp. The films are brittle and have low electrical breakdown strength. In order to optimize the mechanical properties and to increase electrical breakdown strength, cyanopolymers of different molecular weights were blended with each other and in some cases with cellulose triacetate (CTA) as a matrix copolymer.

Films of the 4 cyanoresins having both high and low molecular weights were hand cast to evaluate the film forming properties for continuous film production. Small scale continuous 5" wide thin films with thicknesses ranging from 2 μm to 39 μm, and weighing about 100 g apiece, were produced with a 5" drum caster.

The film casting procedure described below was used for cyanoresin, cellulose triacetate (CTA) and cyanoresin/CTA blend films. A mixture of chloroform and dichloromethane was most often used as the solvent for film casting, especially the CTA blends, though acetone was also used for casting some of the cyanoresin blends.

The polymer or polymer blend was dissolved in 1500 ml of solvent mixture, using a ball mill with ½"×½" Burundum cylinders in a ½ gallon ball mill jar. The solution process was carried out overnight to ensure complete dissolution. The polymer concentration in solution ranged between 5% and 10% by weight, and yield a desirable viscosity for drum casting. The casting drum temperature was set at 30° C.; the speed for film production was very slow (several feet per minute). The film was dried by passage through an electric oven after being lifted from the casting drum, and then wound on to a 6" cord under tension to induce orientation. The temperature of the oven ranged from 60° C. to 190° C. depending upon the nature of the polymer film.

A method of casting uniform films has been developed in accordance with the invention. The method is based on casting the resin solution onto a casting surface such as a drum from a solution in a solvent mixture containing a small amount of non-solvent having a low vapor pressure. Since the non-solvent is the last to evaporate, it lifts the film from the casting surface. The film is self-releasing. A preferred non-solvent is an alkoxy substituted lower alkonal containing 3–8 carbon atoms such as 2-methoxyethanol (DME). A halogenated solvent mixture for CTA blends can be a mixture of 35–40% by weight of chloroform and 40–75% by weight dichloromethane.

The rewind drum for the drum casting apparatus can be set to apply tension to orient the film. Uniaxial (machine direction) stretching induces crystallinity which increases electric breakdown resistance. Biaxial stretching will further increase crystallinity. Biaxial stretching can be achieved by side gripping members which grip the edges of the cast film and transversely stretch the film followed by machine direction stretching.

Referring now to FIG. 1, films 12 of from about 2 μm thick to about 40 μm thick are produced by the solution casting method of the invention. Films 2–20 μm thick preferably 5–10 μm thick are the typical thicknesses for use as an active dielectric film 30 in capacitors 32 as shown in FIG. 2 or as an active dielectric film 12 containing a single metallized layer 18 as shown in FIG. 1.

Figure 2:
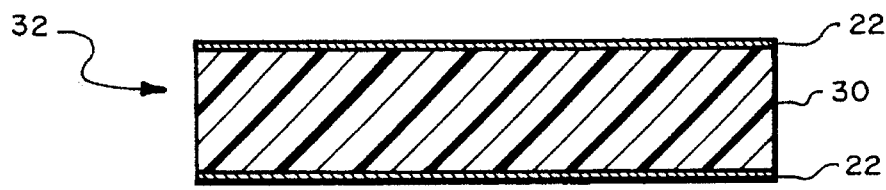
FIG. 2 is a cross-sectional view of a capacitor including a cyanoresin dielectric film.

Electrodes 22 are thin metal electrodes, the metal can be aluminum, zinc, copper, etc., with a thickness of approximately 2–5 μm dielectric film 30 to form a capacitor device 32 as shown in FIG. 2.

The chlorinated solvent mixture comprised 64.5% by weight of dichloromethane 35% by weight of chloroform and 0.5% by weight of 2-methoxyethanol (DME). DME has the highest boiling point but has low vapor pressure. It is the last to evaporate and gently lifts the thin film form the surface of the drum to provide self-releasing characteristics.

Most of the hand cast cyanoresin films had poor mechanical properties. Good films were produced from mixtures containing more than 50% by weight of high molecular weight cyanoethyl-hydroxyethyl cellulose (CRE) having a viscosity above 20,000 cp with a minor amount of a cyanoethylcellulose (CRC) having a viscosity of about 100 to 600 cp. Preferred blends contain 60–90% CRE and 10–40% CRC. A blend of 80% CRE and 20% CRC gave an electrical breakdown strength of ~4.5 KV/mil; a dielectric constant of 16.16 and a dielectric loss of 0.04.

High molecular weight CRE film (CP54,600) gave a dielectric constant of 16.24; a dielectric loss of 0.05 and an electrical breakdown strength of ~4.5 KV/mil. X-ray diffraction results showed both the CRE and CRE/CRC films to be amorphous. From the thermal properties, mechanical properties and film processability of the various cyanoresins, that the high molecular weight CRE polymer shows the most promise for use as a dielectric in capacitors.

In order to increase the electrical breakdown strength of CRE films, the CRE resin can be blended with from 20–80% by weight of a compatible, semi-crystalline polymer such as cellulose triacetate. Solutions of 5–10% CTA resin and of a CRE/CTA blend in the chloroform-dichloromethane-DME solvent system were prepared and cast on the 5 inch drum caster to form a CTA film 13 μm thick and a CRE/CTA film 25 μm thick.

The 13 μm CTA film was dried at 160° C. under tension, and its thermal, morphological and electrical properties were evaluated. This particular film was also used to establish the experimental conditions required to induce CTA crystallinity. X-ray diffraction (XRD) data, not shown, indicates that the CTA film is oriented and amorphous. This film can be subsequently crystallized at 250° C. after 30 minutes without load. Crystallinity was calculated to be about 23.7%.

Thermomechanical analysis (TMA) was next performed on CTA films in order to assess thermal and dimensional stability. The CTA film is oriented and amorphous. The TMA indicates a glass transition temperature (Tg) of 185.8° C. At 207.5° C., the CTA stated to crystallize. The melting temperature (Tm) of CTA is 271.4° C. The X-ray and TMA data suggest that the crystallinity of CTA film can be increased by biax-orientation under stress, at a high temperatures of up to 250° C. The 13 μm CTA cast film gave a dielectric constant value of 3.6; dielectric loss of 0.016 and a DC electrical breakdown strength of 12.15 KV/mil.

Figure 3:
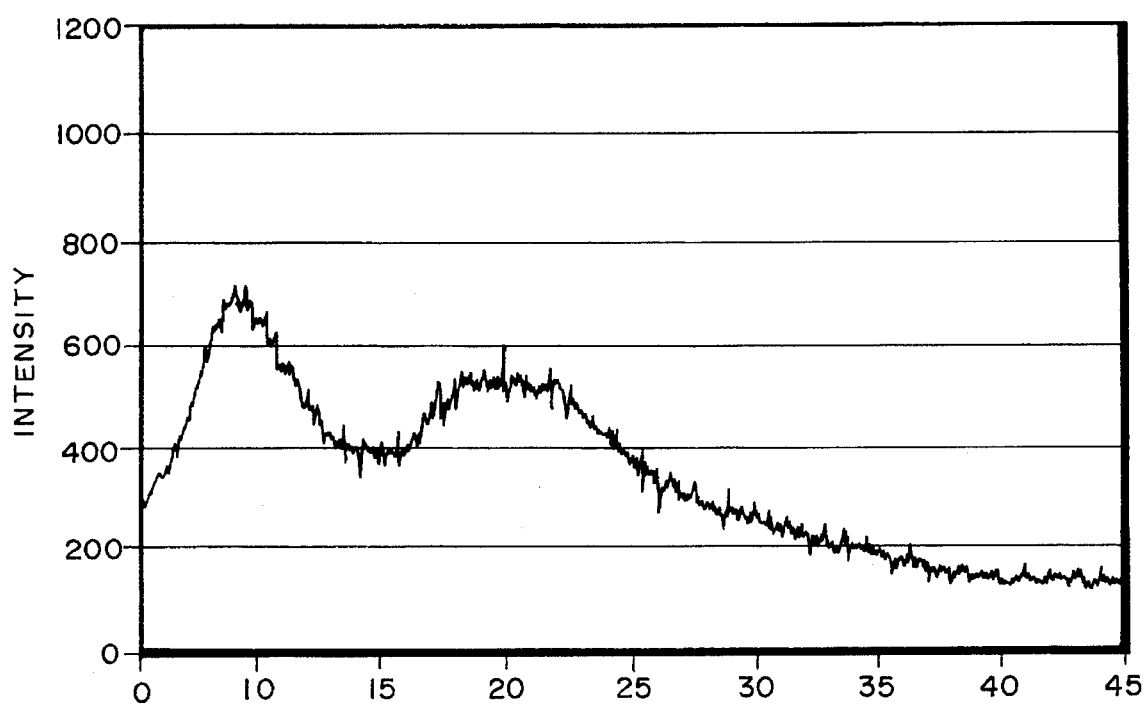
FIG. 3 is an x-ray diffraction (XRD) spectrum of a CRE/CTA film.
Figure 4:
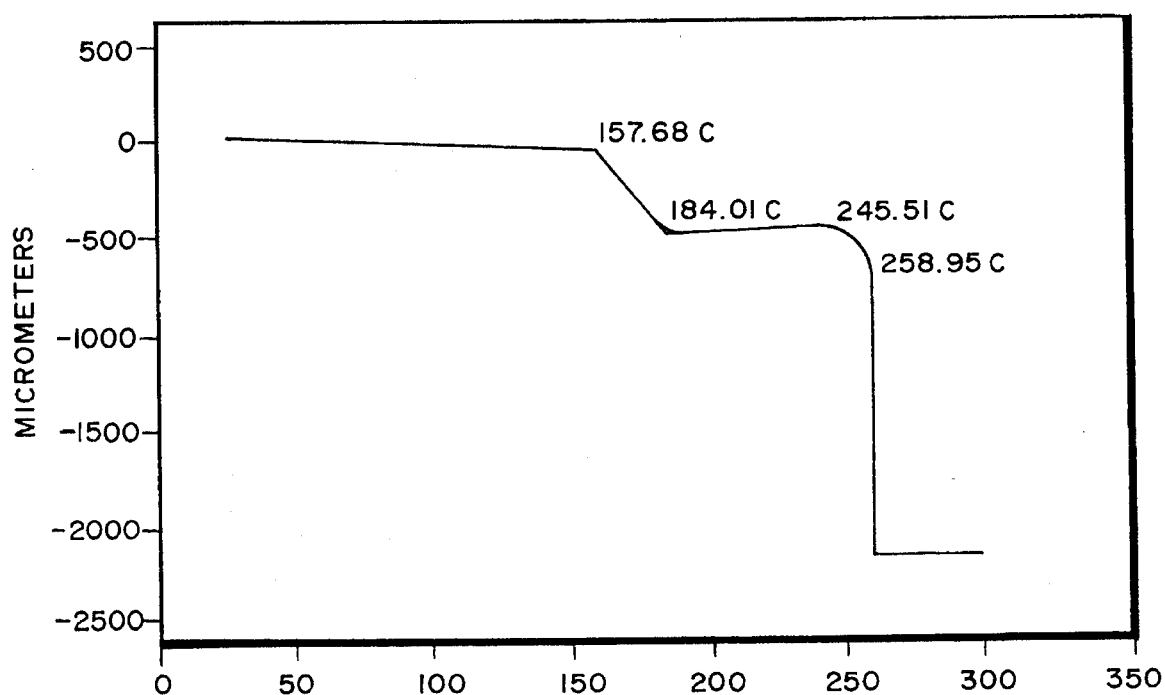
FIG. 4 is a thermomechanical analysis (TMA) of a CRE/CTA film.

A small roll (~100 gm) of 5 inch wide, 25 μm thick CRE/CTA (1/1) blend film was produced with a drum caster. The film was dried at 150° C. under tension. X-ray diffraction data (XRD) shown in FIG. 3 indicates that the film is amorphous but oriented. The TMA data for this film, shown in FIG. 4, show a Tg of 157.7° C. The film started to crystallize at 184° C., and its melting point was ~245.5° C. The TMA data indicates that this film should be able to withstand temperatures up to 150° C. For purposes of comparison, the electrical properties of all four matrix polymer films are summarized in Table 2.

TABLE 2

| Sample | Film Thickness (μm) | Dielectric Constant (KHz) | Dielectric Loss (KHz) | Avg. Breakdown Strength DC (KV/mil) |
| --- | --- | --- | --- | --- |
| CTA | 13 | 3.60 | 0.016 | 12.15 |
| CRE | 39 | 16.24 | 0.050 | 3.0 |
| CRE (80) CRC (20) | 25 | 16.16 | 0.040 | 4.6 |
| CRE (50) | 35 | 7.87 | 0.031 | 9.42 |

TABLE 2-continued

| Sample | Film Thickness (μm) | Dielectric Constant (KHz) | Dielectric Loss (KHz) | Avg. Breakdown Strength DC (KV/mil) |
|---|---|---|---|---|
| CTA (50) | | | | |

The oriented amorphous CRE/CTA film (~35 mm thick) gave dielectric constant of 7.87 (1 kHz), a dielectric loss of 0.031 (1 kHz) and an average DC breakdown strength of 9.42 KV/mil. If the morphology of this cast film is optimized with biaxial orientation (by inducing crystallinity to the cast film), the film should display a breakdown strength exceeding 15 KV/mil. The thickness of the film will decrease during stretching.

The present invention represents the first synthesis of a capacitor film with both a high dielectric constant and a high breakdown strength. Its thickness ranges from 2 μm to 30 μm. This film can be made from commercial high dielectric constant cyanoresins and cyanoresin/cellulose triacetate CTA blends. A continuous solution process for casting of the thin films of cyanoresins has been developed. The very high oxygen to carbon ratio of the film contributes to self-healing of dielectric films when used in capacitors providing high reliability devices.

It is to be realized that only preferred embodiments of the invention have been described and that numerous substitutions, modifications and alterations are permissible without departing from the spirit and scope of the invention as defined in the following claims.

We claim:

1. A capacitor comprising in combination:

a dielectric layer formed of a blend of a cyanoresin with a compatible second resin having at least 20% crystallinity; and a metal film adjacent a surface of the layer.

2. A capacitor according to claim 1 in which the blend comprises 10%–90% by weight of a first high molecular weight cyanoresin and 10%–90% by weight of a second high molecular weight cyanoresin.

3. A capacitor according to claim 2 in which the first cyanoresin is cyanoethyl hydroxyethyl cellulose.

4. A capacitor according to claim 3 in which the second high molecular weight cyanoresin in the blend is selected from the group consisting of cyanoethyl cellulose and cyanoethyl pullulan.

5. A capacitor according to claim 1 in which the second compatible resin is cellulose triacetate.

6. A capacitor according to claim 1 in which the cyanoresin has a nitrogen content from 5–20% by weight.

7. A capacitor according to claim 6 in which the cyanoresin is a cyano-lower-alkylated resin selected from the group consisting of pullulan, polyvinyl alcohol, cellulose and hydroxyethyl cellulose.

8. A capacitor according to claim 1 in which the crystallinity of the compatible second resin is effected by uniaxial or biaxial orientation of the layer.

\* \* \* \* \*